June 8, 1926.  
J. E. PELLETIER  
1,588,331  
VALVE GRINDER  
Filed Feb. 10, 1923 3 Sheets-Sheet 2
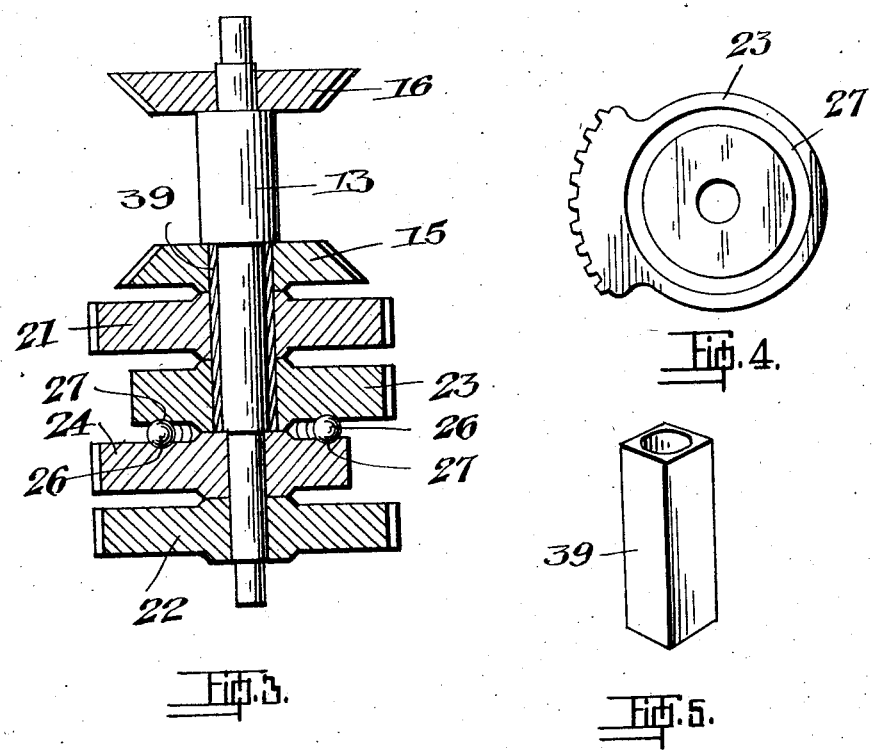
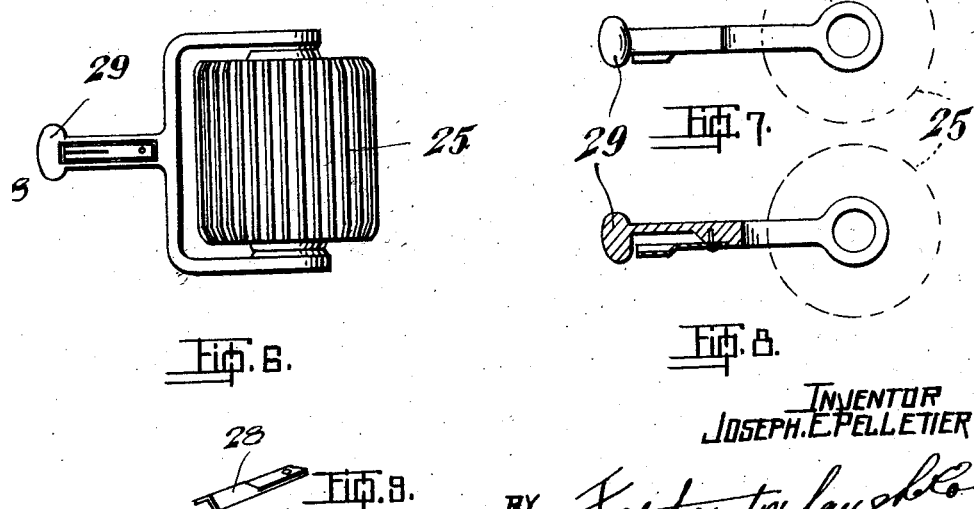
INVENTOR
JOSEPH. E. PELLETIER.
BY Featherstonhaugh & Co.
ATTYS.

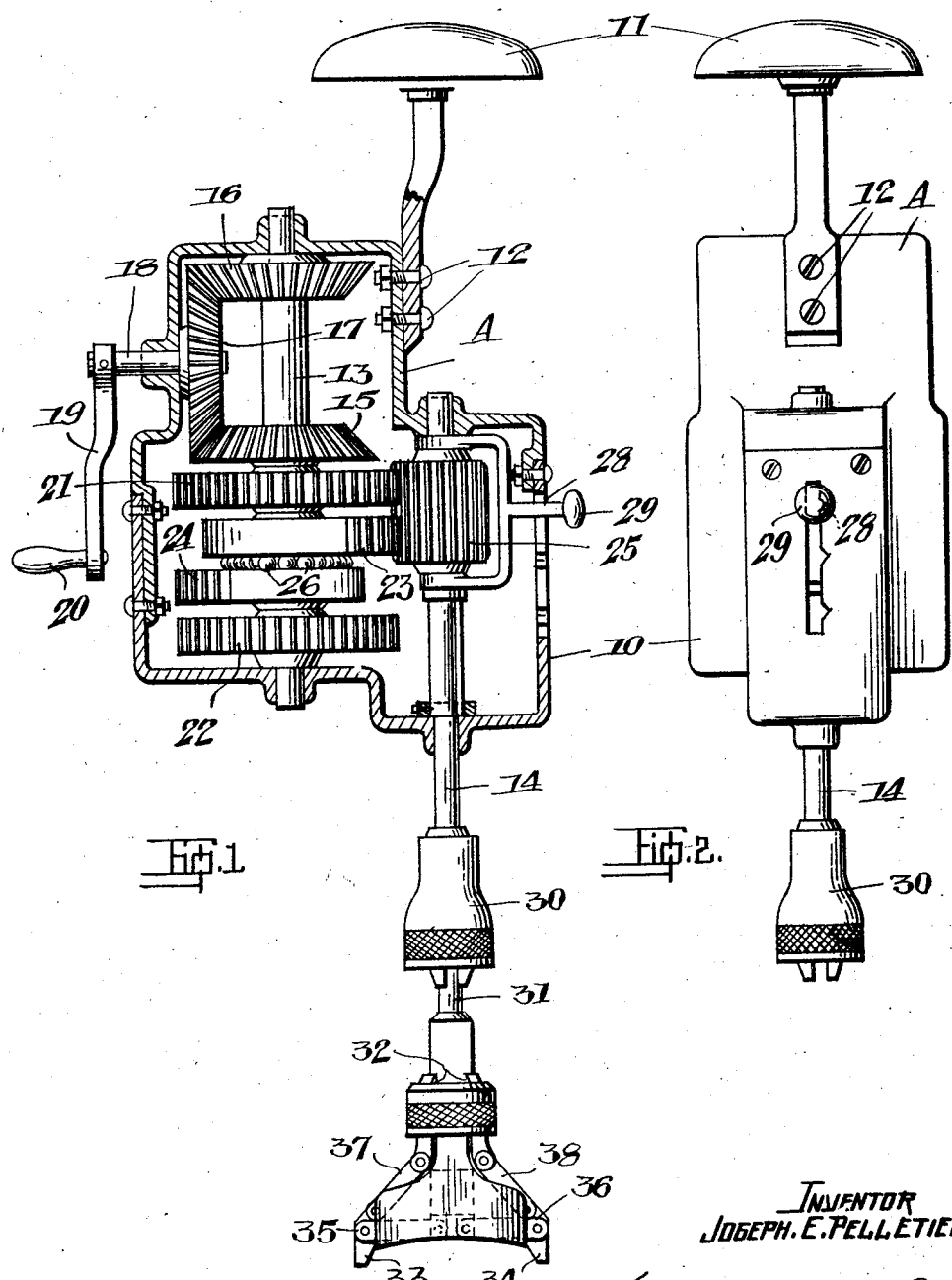

June 8, 1926.
J. E. PELLETIER
VALVE GRINDER
Filed Feb. 10, 1923
1,588,331
3 Sheets-Sheet 3
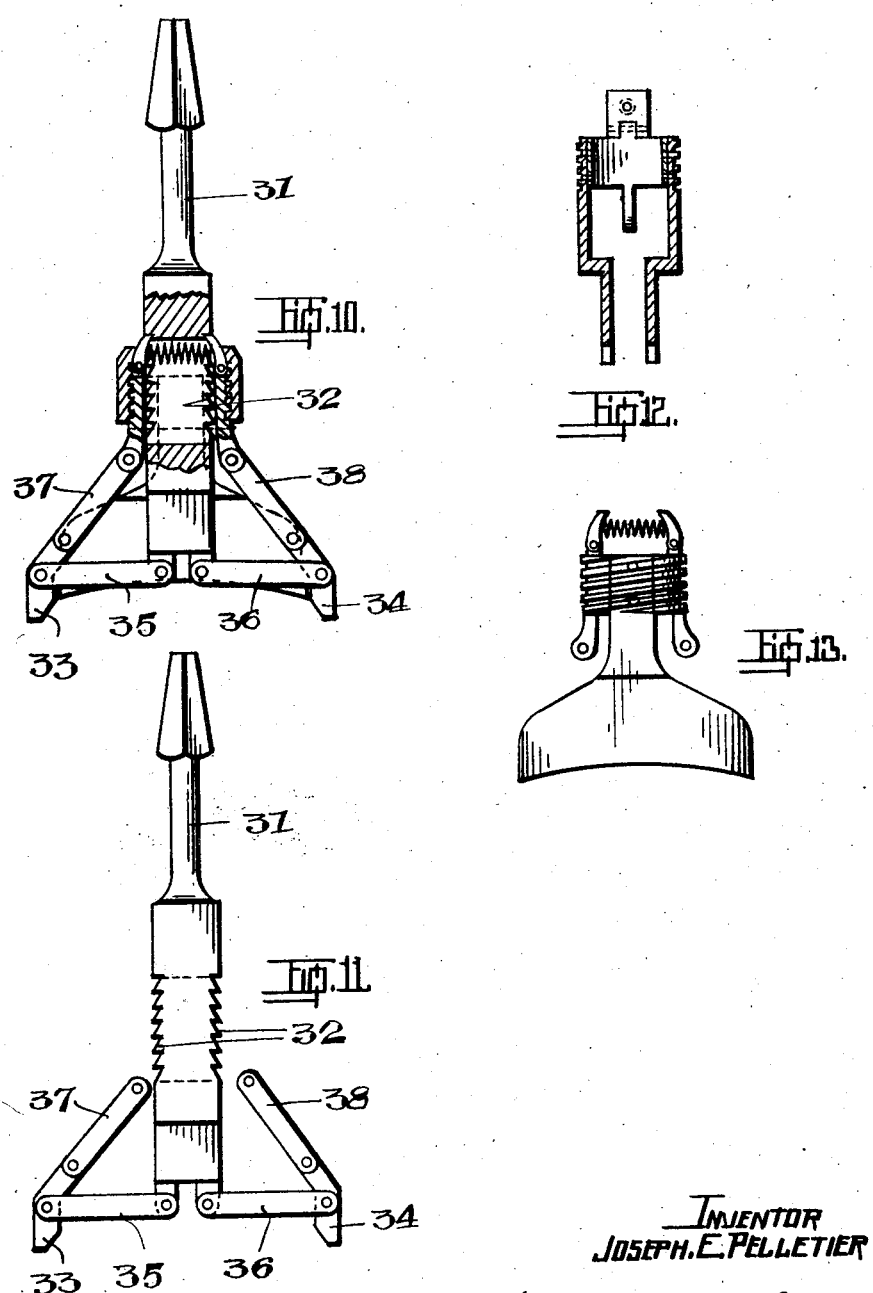
INVENTOR
JOSEPH E. PELLETIER Patented June 8, 1926.

1,588,331

UNITED STATES PATENT OFFICE.

JOSEPH ETIENNE PELLETIER, OF PELLETIER'S MILLS, NEW BRUNSWICK, CANADA.

VALVE GRINDER.

Application filed February 10, 1923. Serial No. 618,421.

This invention relates to improvements in valve grinders, and the objects of the invention are to provide a simply constructed and efficient tool of this character in which the several parts will satisfactorily perform the various functions required of them, and which is adapted to fit any form of valve irrespective of size, even valves requiring a screw-driver.

With the foregoing and other objects in view, the invention consists essentially in the combination and arrangement of parts as described in the present specification and illustrated by the accompanying drawings that form part of the same.

Referring to the drawings, in which like characters of reference indicate corresponding parts in each figure, and in which:

Figure 1 is a sectional elevation of my invention.

Figure 2 is a front elevation.

Figure 3 is a longitudinal section through the operating gears.

Figure 4 is a plan view of the quarter gear.

Figure 5 is a perspective view of the square boxing.

Figure 6 is a side elevation of the sliding gear.

Figure 7 is a top plan of the yoke.

Figure 8 is a section on the line 8—8 of Figure 6.

Figure 9 is a perspective view of the spring holder.

Figure 10 is an elevation partly in section of the valve bit.

Figure 11 is a side elevation of the rack and links for the bit.

Figure 12 is a section on line 12—12 of Fig. 10.

Figure 13 is a side elevation of the supporting plates for the bit.

In the drawings:

A designates the tool as a whole comprising a casing 10 provided with a suitably arranged push handle 11 bolted thereto at 12. Within the casing 10 is mounted the driving shaft 13 and bit operating shaft 14. Fixedly mounted on the shaft 13 and spaced thereon are bevel gears 15 and 16 adapted to mesh with a similar gear 17 carried by a horizontal shaft 18 journalled in the side of the casing 10 and connected at its outer end to a crank 19 provided with an operating handle 20.

Also mounted on the shaft 13 substantially in pairs are the driving gear 21 and the quarter gear 23 comprising one pair and a driving gear 22 and three-eighths gear 24, the other pair, both pairs being designed in turn to mesh with a sliding gear 25 hereinafter more fully described, on the shaft 14, whereby the said shaft is rotated in different directions.

26 are ball bearings for the quarter gear 23 and three-eighths gear 24 designed to operate in raceways 27 therein. The sliding gear 25 on the shaft 14, as above mentioned, is designed to mesh respectively with one of the driving gears and the quarter gear, and is shown in Figure 1 as meshing with the driving gear 21 and the quarter gear 23.

This sliding gear 25 is spring held at 28 and provided with an operating button 29 operable from the outside of the casing whereby the gear is slidably operable on the shaft 14 to engage with the different pairs of driving and quarter gears, as above mentioned.

The shaft 14 extends beyond the casing 10 and is provided at its lower end with a socket member 30 in which is mounted a bit member 31 having a rack 32 and the drillers 33 and 34 connected by means of links 35, 36, 37, and 38 to bit 31. This link connection of the grinding elements with the bit is a feature of my invention whereby it is readily adapted to any size of valve, the links being foldable. 39 is the box casing for the axle 13.

In operation when the crank 19 is turned to the right and the slide gear 25 is in mesh with the full gear 21, as shown in Figure 1, the shaft 14 and the socket 30 thereon will turn to the left. Then on the button 29 being operated downwardly the sliding gear 25 will be brought into mesh with the full gear 22, the crank 19 being still turned to the right. The rotation of the shaft 14 with socket 30 will be reversed and will be continued to the right. Thus, by operating the member 29 to move the sliding gear 25, the shaft 14 is first operated in one direction and then in the reverse direction, this being due to the fact that the gears 15, 21 and the quarter gear 23, as illustrated more particularly in Figure 3, are all mounted on the squared sleeve 39 on the shaft 13 while the gears 16, 22, and the three-eighths gear 24 are keyed to the shaft 13 so that, on the crank 19 being turned say to the right, the gears 15, 21 and the quarter gear 23 will be turned to the right while the gears 16, 22 and 24 keyed directly on the shaft 13 will at the same time rotate in the opposite direction to the left. Furthermore, when the tool is in operation both the sleeve 39 and the shaft 13, as will be noted from the foregoing, rotate in opposite directions. When an oscillatory movement of the driven shaft is required the sliding gear 25 is brought into mesh with the gears 23 or 24. On the crank 19 being turned to the right the sleeve 39, on which is mounted the three-eighths gear 24, is also turned to the right, rotating the shaft 14 in a left hand direction and, when the three-eighths of a turn has been made, the gear 24 will cease to mesh with the gear 25 but will continue in its direction of rotation. A pause is thus caused in the operation of the gear 25 until the quarter gear 23 rotating in the opposite direction comes into mesh with the gear 25, thus turning the shaft 14 to the right. It will accordingly be seen that the shaft 14 in operation may be first rotated three-eighths of a turn to the left and then one-quarter of a turn to the right which gives the tool member the oscillatory motion necessary in grinding valves. It will further be seen that, as one gear travels three-eighths of a turn in one direction, the other gear is turned only one-quarter of a turn in the opposite direction, thereby gradually making a complete turn with the oscillatory motion.

As many changes could be made in the above construction and many apparently widely different embodiments of my invention within the scope of the claims, constructed without departing from the spirit or scope thereof, it is intended that all matter contained in the accompanying specification and drawings shall be interpreted as illustrative and not in a limiting sense.

What I claim as my invention is:

1. In an improved tool of the character described, a casing, a driving shaft in the casing, a driving gear keyed on said shaft, a crank shaft and a gear on said crank shaft adapted to mesh with the gear on the driving shaft, a sleeve on the driving shaft, and a gear carried by said sleeve adapted also to mesh with the gear on the crank shaft whereby, on the crank shaft being operated, the shaft is rotated in one direction and the sleeve is rotated in the opposite direction, a full gear and a quarter gear on said sleeve, and a three-eighths gear and a full gear on the driving shaft, a bit-carrying shaft adjacent the driving shaft and a slidable gear on said shaft adapted to mesh with said gears on the driving shaft and the sleeve respectively whereby the bit-carrying shaft is rotated continuously in one direction or intermittently in opposite directions.

2. In a tool of the character described, the combination with a bit-carrying shaft having a sliding gear thereon, and means for operating said gear, of a shaft having a driving gear thereon and a full gear and a lesser gear adapted to engage with the sliding gear, a sleeve on said shaft, a second driving gear on said sleeve, and a full gear, and a lesser gear on said sleeve, a driving shaft and a gear carried by the driving shaft adapted to mesh simultaneously with the driving gear on the main shaft and the driving gear on the sleeve, said sliding gear being designed to mesh with the lesser gear on the shaft and the lesser gear on the sleeve whereby the bit shaft is first turned in one direction and then in the other to impart an oscillatory motion to the bit.

3. In a rotary tool, a bit carrying shaft, a sliding gear thereon, a main shaft, a driving gear keyed thereon, a full gear and a lesser gear on said shaft, adapted to engage with said sliding gear, a sleeve on the main shaft, a second driving gear on said sleeve, a full gear and a quarter gear on said sleeve, a single gear adapted to mesh with the driving gears on the sleeve and the shaft, whereby the shaft rotates in one direction and the sleeve in the opposite direction and means for adjusting the sliding gear.

In witness whereof I have hereunto set my hand.

JOSEPH ETIENNE PELLETIER.